US006334553B1

(12) United States Patent
Bouras et al.

(10) Patent No.: US 6,334,553 B1
(45) Date of Patent: Jan. 1, 2002

(54) ANTI-FLOAT PLUNGER FOR PNEUMATICALLY ACTUATED SYRINGE

(75) Inventors: Carlos E. Bouras, Encinitas; Nick I. Mellos, San Diego, both of CA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/519,298

(22) Filed: Mar. 6, 2000

(51) Int. Cl.[7] ................................ B67D 5/42; G01F 11/00

(52) U.S. Cl. ........................ 222/386; 222/386.5; 222/389

(58) Field of Search ................................ 222/386, 386.5, 222/309, 389, 326, 327

(56) References Cited

U.S. PATENT DOCUMENTS

| | | | | |
|---|---|---|---|---|
| 4,201,209 A | * | 5/1980 | LeVeen et al. | 128/218 P |
| 4,907,727 A | * | 3/1990 | Ernst et al. | 222/386.5 |
| 5,718,357 A | * | 2/1998 | Dang | 222/153.06 |
| 5,746,357 A | * | 5/1998 | Beveridge et al. | 222/386 |
| 5,927,560 A | | 7/1999 | Lewis et al. | 222/263 |
| 5,992,688 A | | 11/1999 | Lewis et al. | 222/1 |

* cited by examiner

*Primary Examiner*—Kevin Shaver
*Assistant Examiner*—Stephanie L. Willatt
(74) *Attorney, Agent, or Firm*—Wood, Herron & Evans, L.L.P.

(57) ABSTRACT

An anti-float plunger for a pneumatically actuated syringe includes an inner cylindrical ring with two open ends held within a cylindrical cover having one open end and one closed end. The open end is at the backside of the plunger. The closed end is at the frontside, in contact with liquid to be forced through the syringe outlet. The cover includes an outer flexible wiper extending around the circumference. This wiper maintains an airtight seal with the syringe walls even when the walls bulge outwardly due to excessive backside pressure. The cover also includes a deformable membrane at the closed end, which deforms away from the outlet to alleviate residual pressure buildup on the liquid in the frontside. This structure eliminates air entrapment within the syringe, while also preventing residual pressure buildup within the syringe.

23 Claims, 2 Drawing Sheets

ANTI-FLOAT PLUNGER FOR PNEUMATICALLY ACTUATED SYRINGE

FIELD OF THE INVENTION

This invention relates to pneumatically actuated syringes, and more particularly to the plungers used in such syringes.

BACKGROUND OF THE INVENTION

Pneumatically actuated syringes are used in dispensing controlled amounts of encapsulants, adhesives, including epoxies or other materials onto circuit boards or integrated circuits during the manufacture thereof, as shown and described in U.S. Pat. No. 5,927,560. The liquid filled syringe supplies, or feeds, liquid to a dispensing pump.

In a conventional set up, the dispensing material comes in standard size syringes. The syringe operatively connects to a valve and pump arrangement to dispense the material onto a substrate in precise amounts. The liquid is forced from the syringe to the pump via a plunger. More specifically, fluid pressure applied to the backside of a piston, or plunger, residing within the syringe forces the plunger toward a liquid outlet located on the frontside of the plunger. Movement of the plunger toward the outlet forces liquid out of the outlet, to the dispensing pump.

In the manufacture of circuit boards or integrated circuits, the syringe plunger must drive the liquid material from the syringe outlet in a consistent and precise manner, to help assure that the dispensed amounts, typically called "shots," will be uniform in size and weight throughout the dispensing procedure. That is, to some extent the precision of the syringe plunger is necessary to achieve a high degree of repeatability with respect to the ultimate dispensing of shots of uniform size and weight.

These liquid dispensing materials are quite expensive, typically costing more than $150.00 per ounce. To assure minimum waste of these expensive liquid dispensing materials, and to avoid running out of dispensing liquid during a dispensing procedure, it would be helpful to know with certainty the fluid level in the syringe. One way this could be done is by monitoring the position of the plunger within the syringe. However, this is typically not done in practice.

One reason this is not usually done is because in some instances the plunger position gives an inaccurate indication of fluid level. This may occur as a result of air becoming entrapped between the plunger and the liquid in the syringe. In this condition the plunger is said to "float" above the liquid. In this floating condition, the position of the plunger does not provide an accurate indication of the amount of liquid left in the syringe. Thus, an operator must guess as to how much liquid remains in the syringe in order to avoid running out. Moreover, with this uncertainty, the operator cannot effectively run the apparatus until the liquid level is known to be empty. As a result, it is inevitable that at least some syringes which still have a usable amount of liquid will be discarded prematurely, representing a waste of this relatively expensive liquid.

Another adverse effect of entrapped air within the syringe is its negative impact on dispensing quality. Air pressure cycling causes volume fluctuations in any air that is entrapped in the syringe. Unlike dispensing fluids, which are incompressible liquids, air contracts under high pressure and expands when pressure is reduced. In some cases, particularly where a continuous fluid path exists between the syringe and the dispensing pump outlet, these volume fluctuations may result in inadvertent drooling, or dripping, of liquid from the dispensing pump outlet. This inadvertent drooling, or dripping, results in wasted liquid and/or liquid being deposited onto undesired areas of the substrate. Furthermore, these volume fluctuations may adversely effect repeatability with respect to dispensing shots of uniform size and weight.

One way air becomes entrapped within the syringe, thereby to "float" the plunger, results from the outward bulging of the syringe walls when air pressure is applied. For instance, in a pressurized condition, such as 80 psig for the backside air pressure, the walls of the syringe tend to bulge outwardly. Because of this bulging, a circumferential air gap forms between the plunger and the inside surface of the syringe. Typically, these components are made of hard plastic, such as polyethylene, and so there is not an airtight seal therebetween.

Thereafter, when the backside air pressure is reduced to zero psig, the syringe walls contract inwardly. Because there is no circumferential airtight seal at the front end of the plunger, where the plunger contacts the liquid, at least some of the air that has been introduced from this cylindrical air gap moves in front of the plunger, between the plunger and the dispensing fluid. Thus, the syringe wall contraction entraps the air between the plunger and the dispensing liquid, thereby causing the plunger to rise, or float. In some instances where air pressure is frequently cycled, the floating distance may accumulate to be as much as ¼" or even ½", for a syringe of 1.6" diameter.

It is therefore an object of the present invention to eliminate the occurrence of a "floating" plunger condition in pneumatically actuated syringes.

It is another object of the present invention to reduce the possibility of air entrapment between the plunger and the liquid in a pneumatically actuated syringe, thereby to promote repeatability in liquid dispensing and to avoid drool.

It is still another object of the present invention to reduce the amount of liquid which is wasted during the use of liquid filled syringes, by enhancing the accuracy of liquid level sensing within the syringe.

SUMMARY OF THE INVENTION

The present invention achieves the above-stated objects via an anti-float syringe plunger having an outer flexible wiper which maintains an airtight seal with the inside surface of the syringe and a forward deformable membrane which deforms to alleviate residual pressure in the syringe when the walls return from their bulged condition.

The flexible wiper maintains a circumferential airtight seal with the inside surface of the syringe. So even when the syringe walls bulge under pressure, the wiper prevents formation of an air gap between the plunger and the inside walls of the syringe. Since an air gap does not form, air should not become entrapped between the piston and the liquid when the syringe walls return from the bulged condition. Thus, the invention eliminates the occurrence of entrapped air which would otherwise cause the plunger to float. Stated another way, the invention eliminates the floating plunger condition.

One result of this airtight seal is an increase in the residual pressure which results from the contraction of the syringe walls when air pressure is released at the backside, In conventional syringe plungers there is no excessive residual pressure buildup due to syringe wall contraction because there is such a loose seal. In contrast, with the plunger/syringe of this invention the residual pressure buildup could otherwise cause liquid drool, or dripping, at the syringe outlet, particularly when used for direct dispensing. However, because of the deformable membrane at the forward end of the plunger, contraction of the syringe walls causes neither inadvertent drooling nor undesired upward movement of the plunger when the syringe walls contract. Rather, the residual pressure which results from contraction of the syringe walls will be alleviated, or absorbed, by deformation of the membrane.

Also, because the plunger of this invention does not float, due to the flexible seal and the deformable membrane, the sensing of plunger position gives an accurate indication of the liquid level. This leads to reduced waste in dispensing liquid.

According to a preferred embodiment of the invention, the plunger includes a rigid cylindrically shaped ring, preferably of plastic, with an outer cover, preferably of silicon rubber, extending thereover. The inner ring may have an inner shelf to support a magnet for sensing purposes. The cover is preferably made in a unitary manner by molding an elastomeric material into a cylindrical shape which is closed at one end. The inner ring is inserted within the cover. The cover includes a radially outwardly extending flexible wiper traversing its entire circumference. Preferably, the cover includes two spaced flexible wipers, a first located at the forward end and a second located at the rear end of the plunger. The second wiper, however, does not extend completely around the cover and does not form a circumferential airtight seal with the syringe walls. Primarily, the second wiper helps to maintain the plunger centered within the syringe.

The closed end of the cover includes the deformable membrane, which is arcuately shaped in cross section. The cover remains in direct contact with the liquid in the syringe regardless of the backside pressure, due to its flexibility and its shape. The present invention may be used advantageously in dispensing various types of liquids, including but not limited to adhesives, sealants, encapsulants, coatings, epoxy, thermal grease, etc.

These and other features of the invention will be more readily understood in view of the following detailed description and the drawings.

DETAILED DESCRIPTION OF THE DRAWINGS

Figure 1:
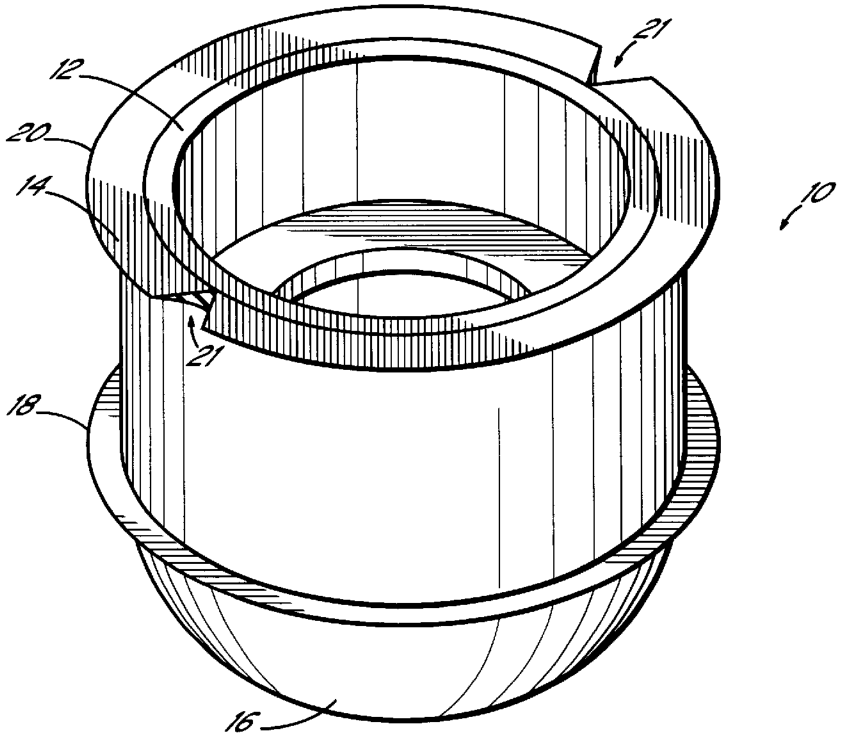
FIG. 1 is a perspective view of an anti-float plunger for a pneumatically actuated syringe, in accordance with a first preferred embodiment of the invention.

FIG. 1 shows an anti-float plunger 10 for a pneumatically actuated syringe in accordance with a first preferred embodiment of the invention. More specifically, FIG. 1 shows an inner ring 12 residing within a cover 14. Preferably, the inner ring 12 is made out of a rigid plastic, such as nylon, whereas the cover 14 is preferably made out of an elastomeric material such as silicon rubber, by molding. The cover 14 has a cylindrical shape with one end closed and one end open. Both ends of ring 12 are open.

To form the plunger 10, the cylindrical ring 12 is inserted within the open end of the cover 14. The cover 14 includes a deformable, arcuately shaped membrane 16 located at a forward end of the plunger 10, which resides in contact with the liquid to be dispensed. The cover 14 also includes a flexible wiper 18 which extends around the entire circumference. The wiper 18 is relatively thin and flexible. A second flexible wiper 20 extends partially but not completely around the cover 14 at the open end thereof. The second wiper 20 helps to center the plunger 10. The second wiper 20 has two discontinuities, or notches 21.

Figure 2:
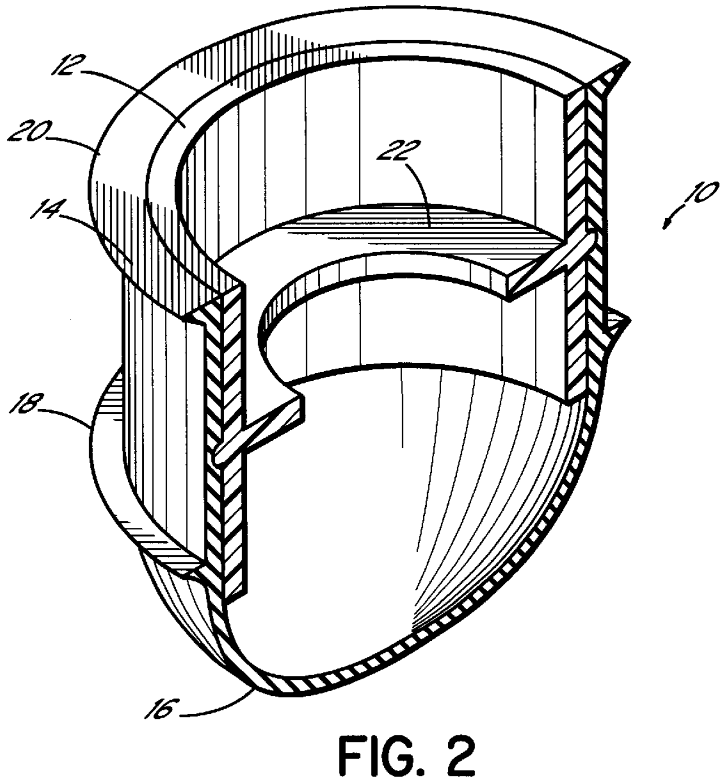
FIG. 2 is a perspective view, similar to FIG. 1, but with a portion of the plunger shown in cut-away view.

FIG. 2 shows the anti-float plunger 10 in partial cut away view, to expose a center shelf 22 formed as part of the ring 12. This shelf 22 may be used to support a magnet (not shown), for magnetic position sensing of the plunger 10, specifically the position of the shelf 22. Alternatively, to achieve the same purpose, i.e. magnetic position sensing, the entire ring 12 may be made of magnetic material, such as a metal, or of a plastic embedded with a magnetic material. With that construction, the upper or lower edge would be sensed, and preferably made with a slightly increased thickness.

Figures 3A, 3B, 3C:
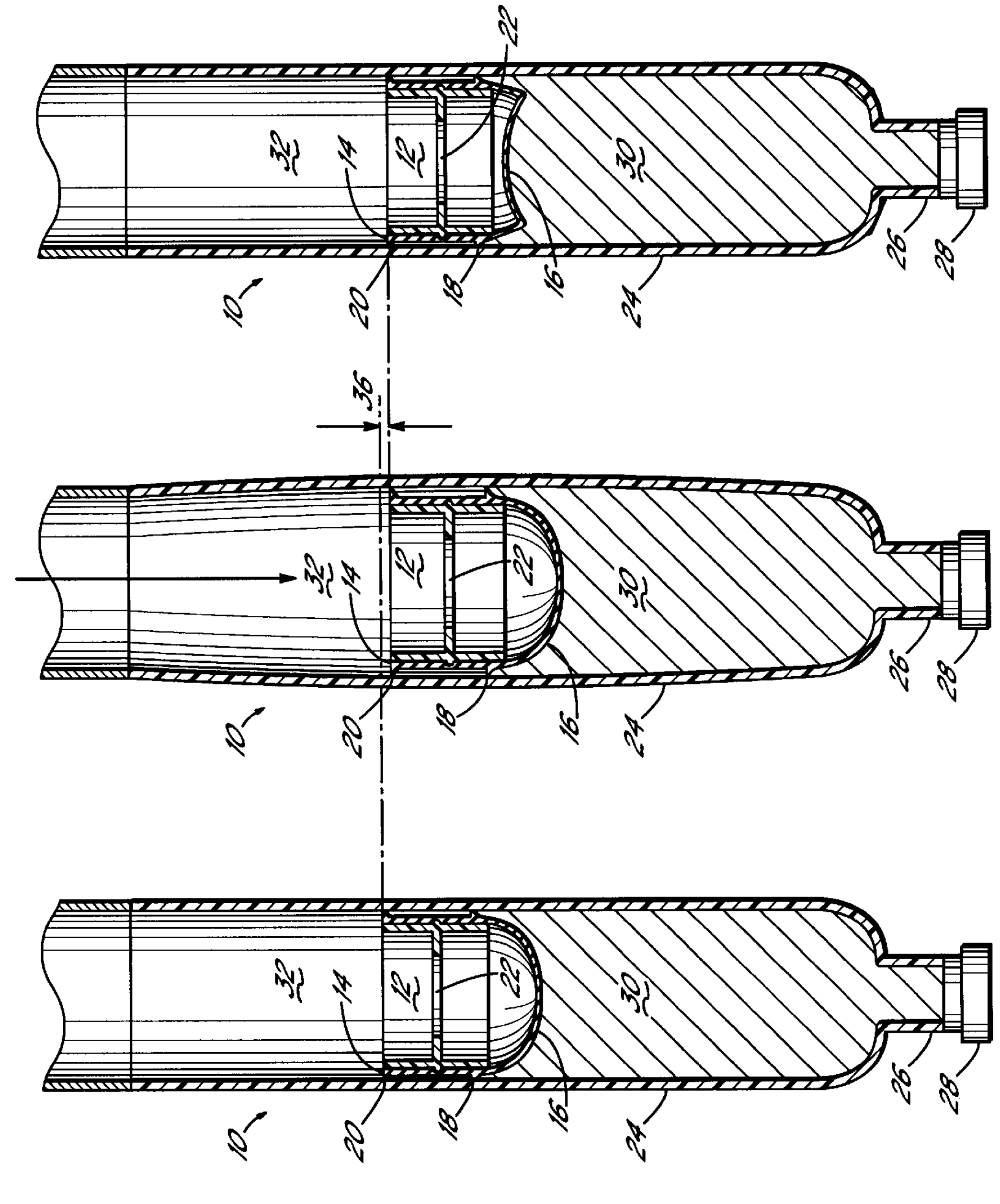
FIGS. 3A, 3B and 3C are longitudinal cross-sectional schematic views which illustrate, in sequence, advantageous aspects of the anti-float plunger of the present invention.

FIGS. 3A, 3B and 3C illustrate the advantageous features of the anti-float plunger 10 of this invention, with respect to a liquid filled syringe 24. The syringe 24 includes an outlet 26, which in these Figures is shown at the bottom. Also, in these Figures the outlet 26 is closed off with a cap 28. However, it is to be understood that this cap 28 is not part of the dispensing system and is removed prior to attaching or connecting the syringe 24 to a dispensing pump, or system. The syringe 24 may be used for example in the type shown in U.S. Pat. No. 5,927,560, which is expressly incorporated by reference herein, in its entirety, as well as other systems.

With reference to FIGS. 3A, 3B and 3C, and relative to the plunger 10 residing within the syringe 24, there is a fluid filled frontside 30 and a backside 32. Liquid flow through outlet 26 normally occurs via application of pressurized air to the backside 32 of the plunger 10, thereby moving the plunger 10 toward the outlet 26 and forcing liquid from the frontside 30 through the outlet 26.

FIG. 3A shows an initial condition wherein the air pressure at the backside 32 of the plunger 10 is zero. The wiper 18 is slightly compressed, to maintain a circumferential airtight seal with the syringe 24. The frontside 30 has no entrapped air, and the membrane 16 is in an outermost position.

In FIG. 3B, the backside 32 of the plunger 10 is pressurized, as for example with an air pressure of 80 psig. This pressurization of the backside 32 causes the walls of the syringe 24 to bulge outwardly. This outward bulging lowers the fluid level. The plunger 10 follows the fluid level by moving downwardly, a distance shown by directional arrows 36. Because the flexible wiper 18 extends circumferentially around the cover 14, the plunger 10 maintains an airtight seal with the walls of the syringe 24, even with high pressure air applied to the backside 32. For a syringe 24 with an inside diameter of 1.6", the uncompressed diameter of the wipers 18 and 20 is preferably about 1.7".

FIG. 3C shows a depressurized condition for the syringe 24, wherein the air pressure on the backside 32 has been returned to zero psig. The release of the air pressure on the backside 32 causes the walls of the syringe 24 to contract. This raises the fluid level within the frontside 30. As a result, the membrane 16 deforms in an upward direction away from outlet 26, to accommodate the raising of the fluid level. Thus, the membrane 16 deforms to alleviate residual pressure within the frontside 30 of the syringe 24 upon the release of backside 32 air pressure. When air is again supplied to backside 32, to deliver liquid from the outlet 26, the membrane 16 will return to its outermost position.

With the present invention, the flexible wiper 18 maintains an airtight seal with the inside surface of the walls of the syringe 24. Thus, air from the backside 32 is not able to move between the plunger 10 and the syringe 24, nor is it able to become entrapped between plunger 10 and the liquid on the frontside 30 of the syringe 24. The notches 21 in second wiper 20 allow the air pressure in the volume residing between cover 14 and syringe 24 to be equal to the air pressure at the backside 32, at all times.

The present invention eliminates inaccuracies in liquid dispensing which could otherwise result from air entrapment on the frontside 30 of the syringe 24. Because the invention eliminates air entrapment between the plunger 10 and the liquid in the frontside 30 of the syringe 24, the present invention makes liquid level sensing more accurate. The sensed position of the plunger 10 more accurately provides an indication of the volume remaining within the frontside 30 of the cylinder of the syringe 24. With increased certainty in sensing the level of the liquid remaining in the syringe 24, an operator can use up the entire contents of the syringe without running the risk of going dry. This also avoids unnecessary or premature changing of syringes 24 which have not been completely emptied.

These advantageous features can be achieved with this inventive anti-float plunger when it is used with a syringe to supply liquid to a dispensing pump, such as, for example those of U.S. Pat. No. 5,927,560, an Asymtek® DP3000 dispensing system manufactured by Asymptotic Technologies, Inc. (Asymtek), or other syringe based system. The advantageous features are also achieved when the invention is used with any other dispensing set up, such as direct deposit of liquid from the syringe to a substrate.

While the present application describes a preferred embodiment of the invention, it is to be understood that variations may be made thereto without departing from the scope of the invention. For instance, those skilled in the art will readily appreciate that the particular structural details shown and described could be varied. For example, the flexible membrane which acts as an accumulator may be substituted with a bladder or a bellows which will change in size in order to accommodate the pressure differences. Alternatively, a slidable element carried in the plunger, like a movable pin or piston could be employed. Therefore, the inventors do not intend this detailed description to be limiting relative to interpretation of the following claims, but rather exemplary of the presently preferred embodiment.

We claim:

1. A plunger comprising:

a cylindrically shaped ring having two open ends;

a cylindrically shaped cover having one closed end and one open end, the ring seated within the cover to close off a first end of the ring;

a flexible wiper extending circumferentially around the cover and extending radially outwardly therefrom; and a deformable membrane located at the closed end of the cover and spaced from the first end of the ring.

2. The plunger of claim 1 wherein the ring further comprises an intermediate shelf.

3. The plunger of claim 1 wherein the ring is plastic.

4. The plunger of claim 1 wherein the flexible wiper is located adjacent the closed end of the cover, and further comprising:

a second flexible wiper located adjacent the open end of the cover, the second wiper extending partially but not completely around the cover, due to at least one notch.

5. The plunger of claim 1 wherein the membrane is arcuately shaped when in an outermost position.

6. The plunger of claim 1 wherein the cover is made integrally out of elastomeric material.

7. The plunger of claim 6 wherein the cover is silicon rubber.

8. The plunger of claim 1 wherein the ring is made of a magnetic material, thereby to facilitate position sensing.

9. An apparatus for dispensing material comprising:

a liquid filled syringe, the syringe having an outlet;

a plunger residing within the syringe and defining a liquid-filled frontside of the syringe and a backside, whereby pressure supplied to the backside moves the plunger toward the outlet to cause liquid to flow outwardly therefrom;

a flexible wiper circumferentially surrounding the plunger and maintaining a tight circumferential seal with the syringe; and a deformable membrane located at an end of the plunger and having an undeformed state and a deformed state, the membrane adapted to remain in the undeformed state when the plunger is moving toward the outlet under the supplied pressure and adapted to deform away from the outlet to the deformed state in response to residual pressure buildup within the frontside of the syringe when the supplied pressure is removed.

10. An apparatus for dispensing material comprising:

a liquid filled syringe, the syringe having an outlet;

a plunger residing within the syringe and defining a liquid-filled frontside of the syringe and a backside, whereby pressure supplied to the backside moves the plunger toward the outlet to cause liquid to flow outwardly therefrom;

a flexible wiper circumferentially surrounding the plunger and maintaining a tight circumferential seal with the syringe;

a deformable membrane located at an end of the plunger and adapted to deform away from the outlet in response to residual pressure buildup within the frontside of the syringe, wherein the plunger further comprises:

a cylindrically shaped ring open at opposing ends; and a cylindrically shaped cover open at one end and closed at another end, the closed end of the cover being the deformable membrane.

11. The apparatus of claim 10 wherein the flexible wiper is integral with the deformable membrane.

12. The apparatus of claim 10 wherein the flexible wiper is located adjacent the closed end of the cover, and further comprising:

a second flexible wiper located adjacent the open end of the cover, the second wiper extending partially but not completely around the cover, the second wiper helping to center the plunger within the syringe.

13. The apparatus of claim 9 wherein the membrane is arcuately shaped when in an outermost position.

14. An apparatus for dispensing material comprising:

a liquid filled syringe, the syringe having an outlet;

a plunger residing within the syringe and defining a liquid-filled frontside of the syringe and a backside, whereby pressure supplied to the backside moves the plunger toward the outlet to cause liquid to flow outwardly therefrom;

a flexible wiper circumferentially surrounding the plunger and maintaining a tight circumferential seal with the syringe;

a deformable membrane located at an end of the plunger and adapted to deform away from the outlet in response to residual pressure buildup within the frontside of the syringe, wherein the plunger further comprises:

a cylindrically shaped ring open at opposing ends, wherein the ring is made of a magnetic material, thereby to facilitate position sensing; and a cylindrically shaped cover open at one end and closed at another end, the closed end of the cover being the deformable membrane.

15. A method of dispensing a liquid material from a pneumatically actuated syringe, the syringe having an outlet and a plunger residing therein and defining a liquid filled frontside adjacent the outlet and also a backside, the plunger having a forward end residing in contact with the liquid material to be dispensed and having an undeformed state and a deformed state, the method comprising:

a) supplying pressurized fluid to the backside of the syringe to move the forward end of the plunger toward the outlet, thereby causing flow of the liquid material through the outlet, while maintaining the undeformed shape of the forward end of the plunger and a circumferential fluid tight seal between the plunger and the syringe; and b) upon termination of the supplying, absorbing residual pressure in the frontside of the syringe via flexible movement of the forward end of the plunger in a direction away from the outlet to the deformed state.

16. The method of claim 15 wherein the pressurized fluid is air.

17. The method of claim 15 wherein the liquid material is selected from the following:

adhesive, sealant, encapsulant, coating, thermal grease and epoxy.

18. The method of claim 15 further comprising:

subsequently repeating said supplying and said absorbing to again cause the flow of liquid material from the outlet, the forward end of the plunger flexibly moving toward the outlet after initial resumption of the supplying.

19. The method of claim 15 wherein the plunger includes:

a flexible wiper which maintains the fluid tight seal with the syringe; and a deformable membrane at the forward end.

20. An apparatus for dispensing liquid material comprising:

a housing having a bore therein coupled to an outlet;

a plunger disposed within the bore and mounted for movement therein;

a flexible seal circumferentially carried by the plunger and abutting the bore of the housing;

a membrane, located at an end of the plunger closest to the outlet, adapted for movement from an undeformed state to a deformed state, the membrane in the undeformed state extending away from the piston and toward the outlet of the housing and in the deformed state the membrane is retracted toward the piston and away from the outlet, the membrane remaining in the undeformed state while dispensing liquid material and whereby retraction of the membrane to the deformed state absorbs residual pressure within the housing.

21. The apparatus of claim 20 wherein the bore is coupled to a source of air pressure for moving the plunger towards the outlet.

22. The apparatus of claim 21 wherein the seal is a flexible wiper.

23. The apparatus of claim 21 wherein the membrane is arcuately shaped when in the undeformed state.

* * * * *